No. 675,306. Patented May 28, 1901.
W. W. ST. JOHN.
PULLEY OR SHEAVE.
(Application filed Oct. 25, 1900.)
(No Model.)

Witnesses:
Albert S Barnes.
Walter S Flint.

Inventor:
William W. St. John,
By T. C. Brecht,
Attorney.

UNITED STATES PATENT OFFICE.

WILLIAM W. ST. JOHN, OF BINGHAMTON, NEW YORK.

PULLEY OR SHEAVE.

SPECIFICATION forming part of Letters Patent No. 675,306, dated May 28, 1901.

Application filed October 25, 1900. Serial No. 34,347. (No model.)

*To all whom it may concern:*

Be it known that I, WILLIAM W. ST. JOHN, a citizen of the United States, residing at Binghamton, in the county of Broome and State of New York, have invented certain new and useful Improvements in Pulleys or Sheaves; and I do hereby declare the following to be a full, clear, and exact description of the invention, such as will enable others skilled in the art to which it appertains to make and use the same.

My invention relates to improvements in grooved pulleys or sheaves for ropes or cords.

The objects of the invention are to produce a pulley or sheave of very simple construction in such manner that the line or rope cannot run off and to dispense with the ordinary side guard now generally required to prevent the said line or rope from running or slipping off, as it is a well-known fact that such side guards cut as well as wear the line or rope out in a short time when in use; furthermore, to bend or form the pin upon which the sheave runs in such manner that it forms a frame for said sheave and at the same time a strong and substantial eye to receive a hook from any place that the pulley or sheave may want to be attached to for use or to suspend it from a desired place, and finally to produce the sheave in two parts and to adapt it to all sizes and kinds of pulleys, as desired, and to do this for a reasonable cost.

To these ends my invention consists in the peculiar construction of certain details and the novel arrangement of parts, as will be more fully described hereinafter and specifically pointed out in the claim, reference being had to the accompanying drawings, in which—

Figure 1:
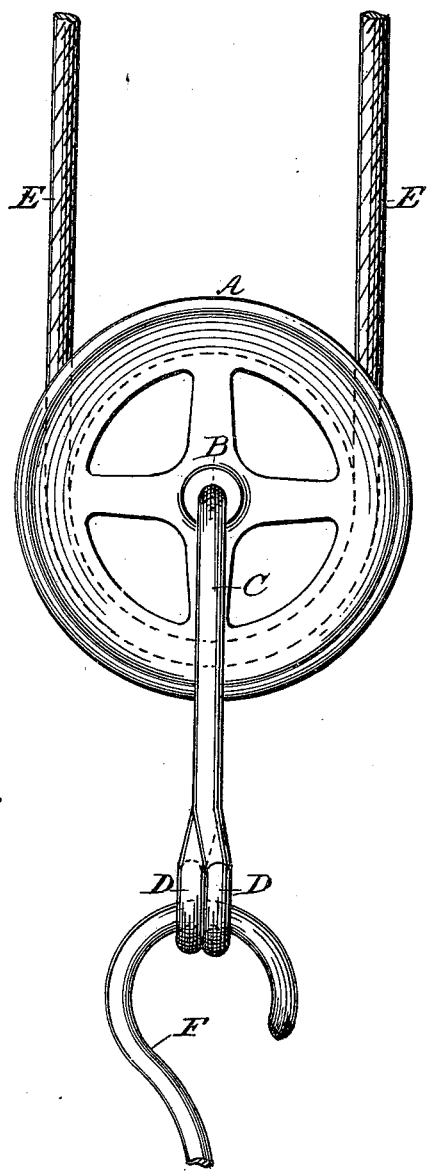
Figure 2:
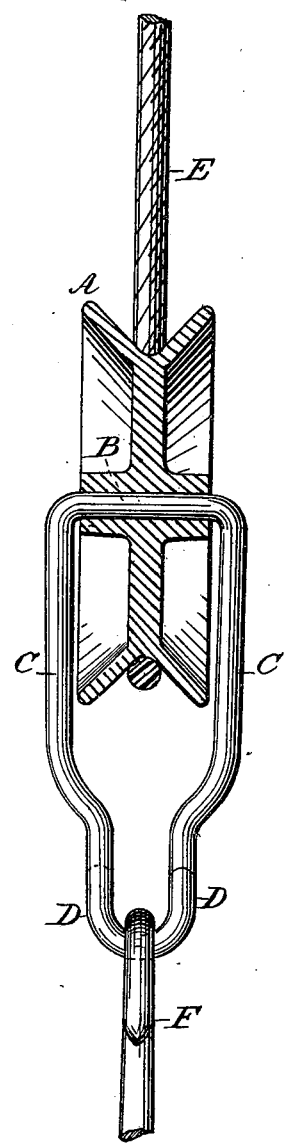

Figure 1 represents a side elevation of my improved pulley and frame. Fig. 2 is a sectional view of the same.

In the drawings, A represents the sheave or pulley, which can be made of iron, brass, aluminium, wood, or any other suitable material, and it may be made of any size desired. The pin B, upon which this sheave or pulley A revolves, is formed into such shape as to produce a frame C of peculiar construction. The sides of the frame first descend perpendicularly, and being slightly reduced in width each end of said frame forms the hooks D D, which are bent in opposite directions, and both together thus form a strong and substantial eye to receive a hook or its equivalent for suspending any article or for attaching the pulley to any desired place for use. The frame serves at the same time for the purpose of a side guard to prevent the line or rope E from running off. By making the inside of the sheave straight to the side of the line at the bottom of said sheave it has a tendency to hold the line in place much better than any ordinary side guard and avoids the cutting of the line or rope.

The pulley is preferably made in two pieces and can be bolted or riveted together, although it may be cast in one piece, if desired.

A hook F can be attached to the eye D to suspend anything from or to it.

Having thus described my invention, what I claim, and desire to secure by Letters Patent, is—

A sheave or pulley A, in combination with a pin B, that forms a frame C, terminating in hooks, bent in opposite directions to form an eye, as and for the purpose specified.

In testimony whereof I affix my signature in presence of two witnesses.

WILLIAM W. ST. JOHN.

Witnesses:
ALBERT S. BARNES,
WALTER S. FLINT.